(12) United States Patent
Ukai (10) Patent No.: US 6,471,398 B2
(45) Date of Patent: *Oct. 29, 2002

(54) TEMPERATURE MANAGEMENT APPARATUS FOR FOODSTUFF IN STORAGE CABINET

(75) Inventor: Yoshiyuki Ukai, Nagoya (JP)

(73) Assignee: Hoshizaki Denki Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,576

(22) Filed: May 10, 1999

(65) Prior Publication Data

US 2002/0039379 A1 Apr. 4, 2002

(51) Int. Cl.[7] ................................. G01K 1/20
(52) U.S. Cl. ............... 374/169; 374/141; 340/585; 62/158
(58) Field of Search ............... 374/169, 141; 312/236; 340/585, 584; 62/125, 126, 127, 132, 157, 158

(56) References Cited

U.S. PATENT DOCUMENTS

| | | | | |
|---|---|---|---|---|
| 3,100,383 A | * | 8/1963 | Foster et al. | 62/126 |
| 3,878,724 A | * | 4/1975 | Allen | 374/169 |
| 4,358,932 A | * | 11/1982 | Helfrich, Jr. | 62/126 |
| 4,697,429 A | * | 10/1987 | Chandler et al | 62/203 |
| 4,913,223 A | * | 4/1990 | Mizuno et al. | 312/236 |
| 5,066,141 A | * | 11/1991 | Ikeda et al. | 374/169 |
| 5,244,277 A | * | 9/1993 | Broussalian et al. | 374/141 |
| 5,355,686 A | * | 10/1994 | Weiss | 62/158 |
| 5,539,381 A | * | 7/1996 | Johnson | 374/169 |
| 5,655,595 A | * | 8/1997 | Westbrooks, Jr. | 312/236 |
| 5,798,694 A | * | 8/1998 | Reber et al. | 340/585 |
| 6,034,607 A | * | 3/2000 | Vidaillac | 340/585 |
| 6,078,262 A | * | 6/2000 | Young | 340/584 |
| 6,158,227 A | * | 12/2000 | Seeley | 340/585 |

FOREIGN PATENT DOCUMENTS

| | | | | |
|---|---|---|---|---|
| EP | 565925 A1 | * | 10/1993 | 374/141 |
| GB | 2084329 | * | 4/1982 | 374/169 |

* cited by examiner

Primary Examiner—Diego Gutierrez
Assistant Examiner—Stanley J. Pruchnic, Jr.
(74) Attorney, Agent, or Firm—Arent Fox Kintner Plotkin & Kahn (57) ABSTRACT

A temperature management apparatus for foodstuffs stored in a storage cabinet, wherein a temperature sensor is placed in the storage cabinet to detect an inside temperature of the cabinet thereby to calculate an ambient temperature of the foodstuffs based on the detected inside temperature, and wherein an internal temperature of the foodstuffs is presumed on a basis of the calculated ambient temperature. The temperature management apparatus is provided with a foodstuff temperature indicator for indicating the presumed internal temperature of the foodstuffs and an alarm device for issuing an alarm sound when the presumed internal temperature of the foodstuffs becomes lower than a lower limit temperature or higher than an upper limit temperature.

6 Claims, 10 Drawing Sheets

Fig.10

TEMPERATURE MANAGEMENT APPARATUS FOR FOODSTUFF IN STORAGE CABINET

BACKGROUND OF THE INVENTION

1. Field of the Invention

The present invention relates to a temperature management apparatus for foodstuffs stored in a storage cabinet such as a refrigerator.

2. Description of the Prior Art

In a conventional storage cabinet for foodstuffs, there is provided a temperature sensor for detecting an inside temperature of the storage cabinet for temperature management of foodstuffs stored in the cabinet. When the inside temperature changes due to open and close of the cabinet door, there occurs a difference between the inside temperature detected by the sensor and the internal temperature of the foodstuffs in accordance with thermal capacity and radiation coefficient of the foodstuffs and a relative position of the sensor to the foodstuffs. For this reason, proper temperature management of the foodstuffs may not be expected.

SUMMARY OF THE INVENTION

It is, therefore, an object of the present invention to provide a temperature management apparatus capable of effecting proper temperature management of foodstuffs stored in a storage cabinet.

According to the present invention, the object is accomplished by providing a temperature management apparatus for foodstuffs stored in a storage cabinet which comprises ambient temperature detection means for detecting an ambient temperature of foodstuffs stored in the storage cabinet and foodstuff temperature presumption means for presuming an internal temperature of the foodstuffs on a basis of changes in the detected value of the ambient temperature in the course of each lapse of a predetermined time.

According to an aspect of the present invention, the ambient temperature detection means includes a temperature sensor placed in the storage cabinet for detecting an inside temperature of the storage cabinet and temperature presumption means for presuming an ambient temperature of foodstuffs stored in the storage cabinet on a basis of changes in the detected values of the inside temperature in the course of each lapse of a predetermined time.

According to another aspect of the present invention, there is provided a temperature management apparatus for foodstuffs stored in a storage cabinet which comprises a temperature sensor placed in the storage cabinet for detecting an inside temperature of the storage cabinet and foodstuff temperature presumption means for presuming an internal temperature of the foodstuffs on a basis of changes in the detected values of the inside temperature in the course of each lapse of a predetermined time.

According to a further aspect of the present invention, the temperature management apparatus further comprises an indicator for indicating the presumed internal temperature of the foodstuffs and alarm means for Issuing an alarm when the presumed internal temperature of the foodstuffs is out of a predetermined temperature range.

BRIEF DESCRIPTION OF TEE DRAWINGS

Other objects, features and advantages of the present invention will be more readily appreciated from the following detailed description of a preferred embodiment of the present invention when taken together with the accompanying drawings, in which.

DESCRIPTION OF THE PREFERRED EMBODIMENT

Prior to description of a preferred embodiment of the present invention, a basic principle adapted to the embodiment will be described for a better understanding of the present invention.

An inside temperature $t_a(\tau)$ of a storage cabinet at a position where foodstuffs are placed or an ambient temperature of the foodstuffs is represented by the following equation (1).

$$t_a(\tau)=t_a(\tau-\Delta\tau)+a\{t_b(\tau)-t_b(\tau)-t_b(\tau-\Delta\tau)\}$$

where "$t_b(\tau)$" is a temperature detected by a temperature sensor placed at an appropriate position in the storage cabinet, "$t_a(\tau-\Delta\tau)$" is an ambient temperature of the foodstuffs before a short time $\Delta\tau$, "$t_b\tau-\Delta\tau)$" is an inside temperature detected by the sensor before the short time $\Delta\tau$, and "a" is a constant or correction coefficient defined by a positional relationship between the stored position of the foodstuffs and the position of the temperature sensor.

In the ease that the ambient temperature $t_a(\tau)$ of the foodstuffs in a short time ($\tau-\Delta\tau$ to $\tau$) is deemed as constant, an internal temperature $t_c(\tau)$ of the foodstuffs can be defined by the following equation (2).

$$t_c(\tau) = t_c(\tau - \Delta\tau) + \{t_a(\tau) - t_c(\tau - \Delta\tau)\}\left(1 - \exp\left(-\frac{K}{C}\Delta\tau\right)\right) \quad (2)$$

where "$t_c(\tau-\Delta\tau)$" is an internal temperature of the foodstuffs before the short time $\Delta\tau$, "C" is a thermal capacity of the foodstuffs, and "K" is a radiation coefficient of the foodstuffs.

Hereinafter, the preferred embodiment of the present invention for presuming a change of the detected temperature in the course of each lapse of the short time based on the foregoing principle will be described.

Figure 1:
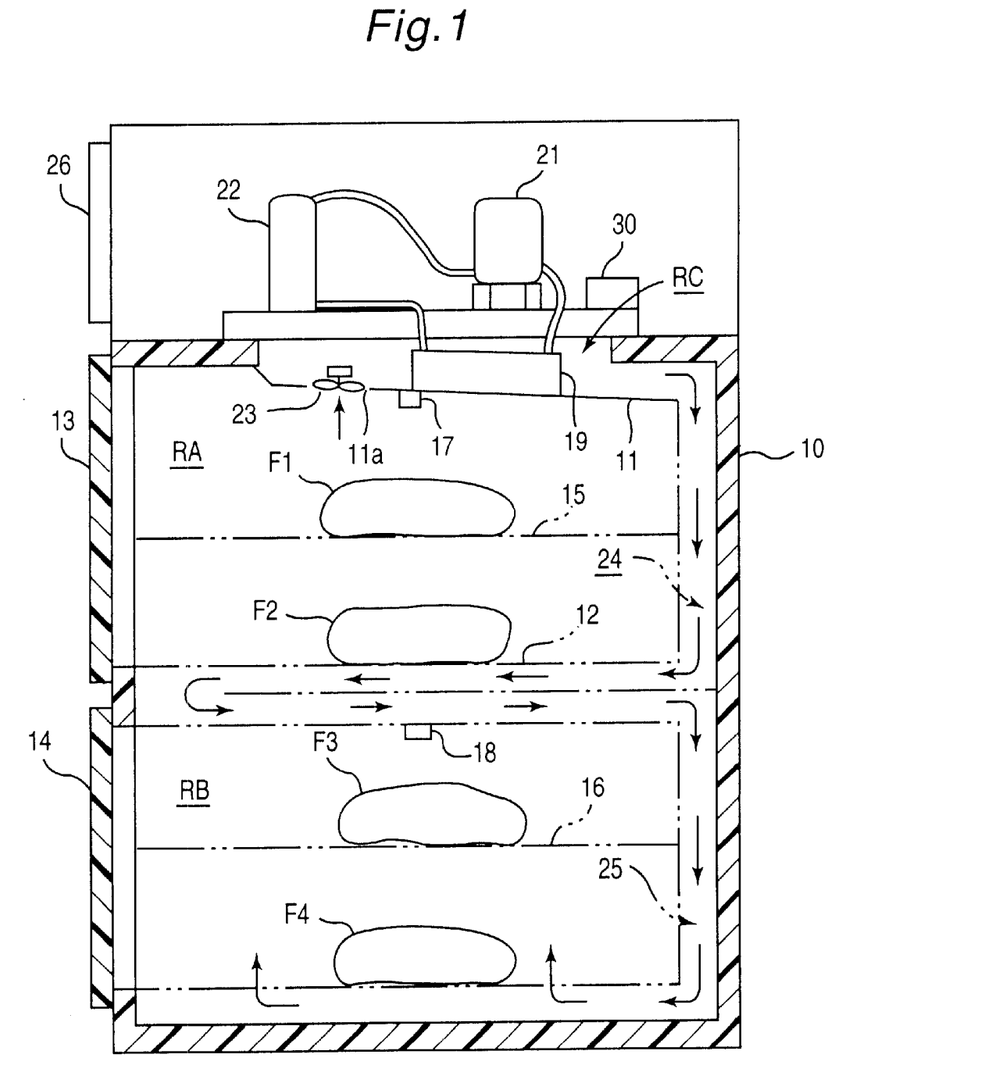
FIG. 1 is a sectional view of a refrigerator the internal temperature of which is controlled by a temperature management apparatus in accordance with the present invention.

FIG. 1 illustrates a sectional view of a cabinet 10 of a refrigerator the interior of which is subdivided into a cooling chamber RC, upper and lower storage chambers RA and RB by means of partitions 11 and 12. The upper and lower storage chambers RA and RB are closed and opened by doors 13, 14 hinged at the front of cabinet 10. The upper and lower storage chambers RA and RB are provided therein with shelves 15, 16 respectively for storing foodstuffs F1, F2 and F3, F4 and also provided with temperature sensors 17, 18 respectively for detecting an inside temperature thereof.

An evaporator 19 mounted on the upper partition wall 11 is supplied with refrigerant compressed by a compressor 21 and condensed by a condenser 22 for cooling the air in cooling chamber RC. The refrigerant is returned into the compressor 21. A cooling blower 23 is mounted within the cooling chamber RC for sucking the air from the upper storage chamber RA into the cooling chamber RC through an aperture 11a formed in the upper partition wall 11 and for discharging the cooled air from the cooling chamber RC into an air passage 24. The cooled air from the air passage 24 is sucked into the cooling chamber RC through an air passage 25, lower and upper storage chambers RB and RA. Thus, the upper and lower storage chambers RA and RB are cooled by recirculation of the cooled air.

Figure 2:
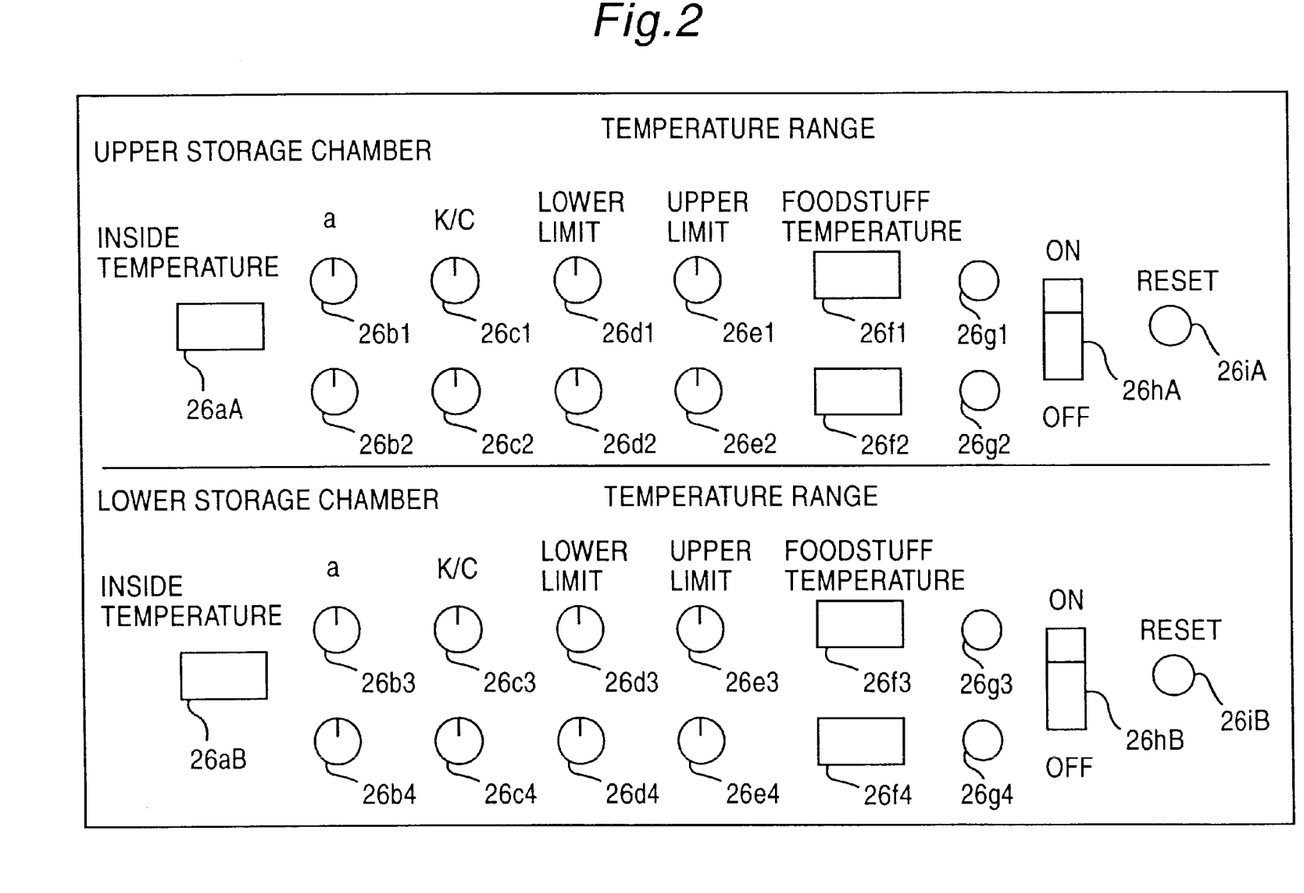
FIG. 2 is a plan view of an operation panel of the temperature management apparatus.
Figure 3:
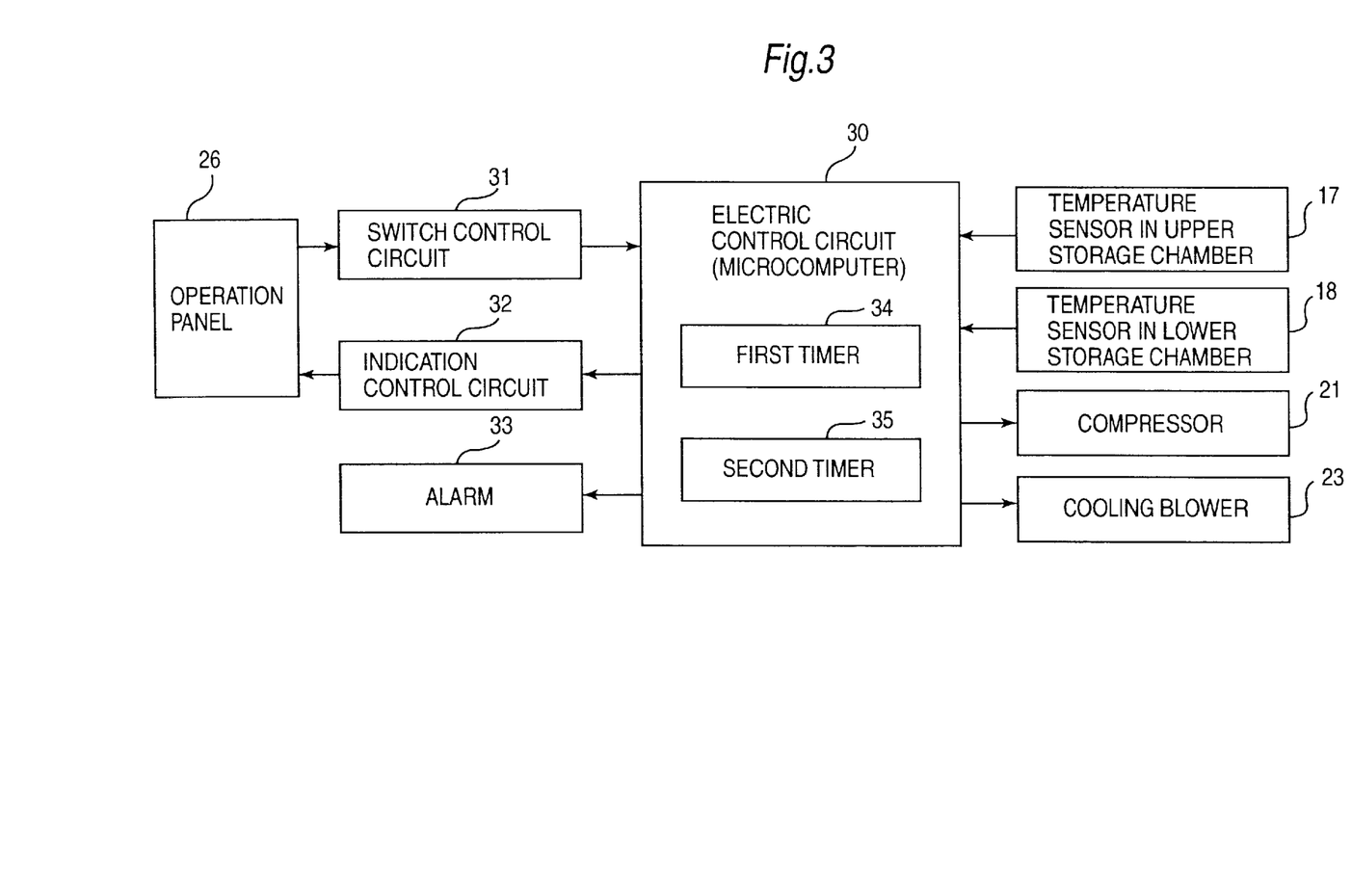
FIG. 3 is a block diagram of an electric control portion of the refrigerator shown in FIG. 1.

As shown in FIG. 2, an operation panel 26 mounted on the refrigerator is provided with inside temperature indicators 26aA, 26aB, dials 26b1–26b4 for setting correction coefficients, dials 26c1–26c4 for setting radiation coefficient/thermal capacity, dials 25d1–26d4 for setting a lower limit temperature, dials 26e1–26e4 for setting an upper limit temperature, foodstuff temperature indicators 26f1–26f4, foodstuff temperature indication lamps 25g–26g4, foodstuff temperature management switches 26hA, 26hB and reset switches 26iA, 26iB. The inside temperature indicators 26aA, 26aB each are in the form of a numerical indicator for indicating each inside temperature detected by the temperature sensors 17 and 18. The dials 26b1–26b4 each are provided for setting correction coefficients $a_1$–$a_4$ related to the respective foodstuffs F1–F4. The dials 26c1–28c4 each are provided for setting values $K_1/C_1$ -$K_4/C_4$ of the radiation coefficient $K_1$–$K_4$ divided by the thermal capacity $C_1$–$C_4$.

The dials 26d1–26d4 are provided for setting lower limit temperatures $'min1$–$'min4$ of the respective foodstuffs F1–F4. The dials 26e1–26e4 are provided for setting upper limit temperatures $t_{max1}$–$t_{max4}$ of the respective foodstuffs F1–F4. The foodstuff temperature indicators 26f1–26f4 each are in the form of a numerical indicator for indicating each internal temperature of the foodstuffs F1–F4. The foodstuff temperature indication lamps 26g1–26g4 are provided to indicate each internal temperature of the foodstuffs F1–F4 with color. The foodstuff temperature management switches 26hA, 26hB are provided to execute temperature management programs of the foodstuffs F1–F4 in the upper and lower storage chambers RA, RB. The reset switches 26i A, 26iB each are in the form of a normally open switch to be closed for starting the temperature management of the foodstuffs F1–F4 in the upper and lower storage chambers RA, RB.

The refrigerator is provided with an electric control circuit 30 connected at one side to the temperature sensors 17, 18, compressor21 and cooling blower 23. The electric control circuit 30 is connected at the other side to the operation panel 26 through a switch control circuit 31 and an indication control circuit 32 and to an alarm device 33 for issuing an alarm sound when either one of the internal temperatures of foodstuffs F1–F4 becomes lower than the lower limit temperature $t_{min1}$–$t_{min4}$or higher than the upper limit temperature $t_{max1}$–$t_{max}$4. The electric control circuit 30 is in the form of a microcomputer programmed to execute a program shown by a flow chart in FIGS. 4 to 10 for control of the compressor 21, cooling blower 23, operation of the alarm 33 and indication on the operation panel 26. The computer 30 includes temperature management timers for the upper and lower storage chambers RA, RB, which timers measure a lapse of time for issuing a timer interruption signal upon each lapse of a short time $\Delta\tau$ and causes the computer 30 to execute a timer interruption program for temperature management of the upper storage chamber RA shown in FIGS. 5 to 7 and a timer interruption program for temperature management of the lower storage chamber RB shown in FIGS. 8 to 10.

Figure 4:
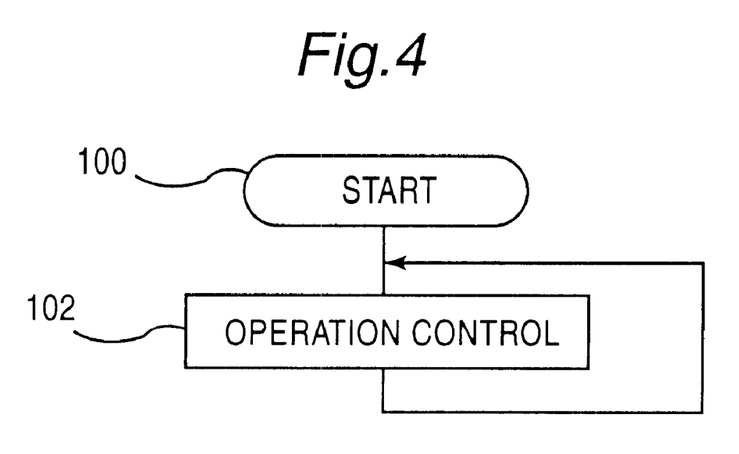
FIG. 4 is a flow chart of a main program executed by a microcomputer shown in FIG. 3.

Assuming that a power source switch (not shown) has been turned on to activate the refrigerator, the computer 30 starts to execute the main program at step 100 in FIG. 4 and repeats processing for control of the operation of the refrigerator at step 102. During execution of the processing for control of the operation of the refrigerator, the computer 30 operates the compressor 21 and cooling blower 23 when the inside temperature detected by sensor 17 becomes higher than the upper limit temperature and maintains the operation of compressor 21 and cooling blower 23 for cooling the air in the upper and lower storage chambers RA, RB until the inside temperature detected by sensor 17 becomes the lower limit temperature. With such control of the compressor 21 and cooling blower 23, each inside temperature of the upper and lower storage chambers RA, RB is maintained between the upper and lower limit temperatures.

Figure 5:
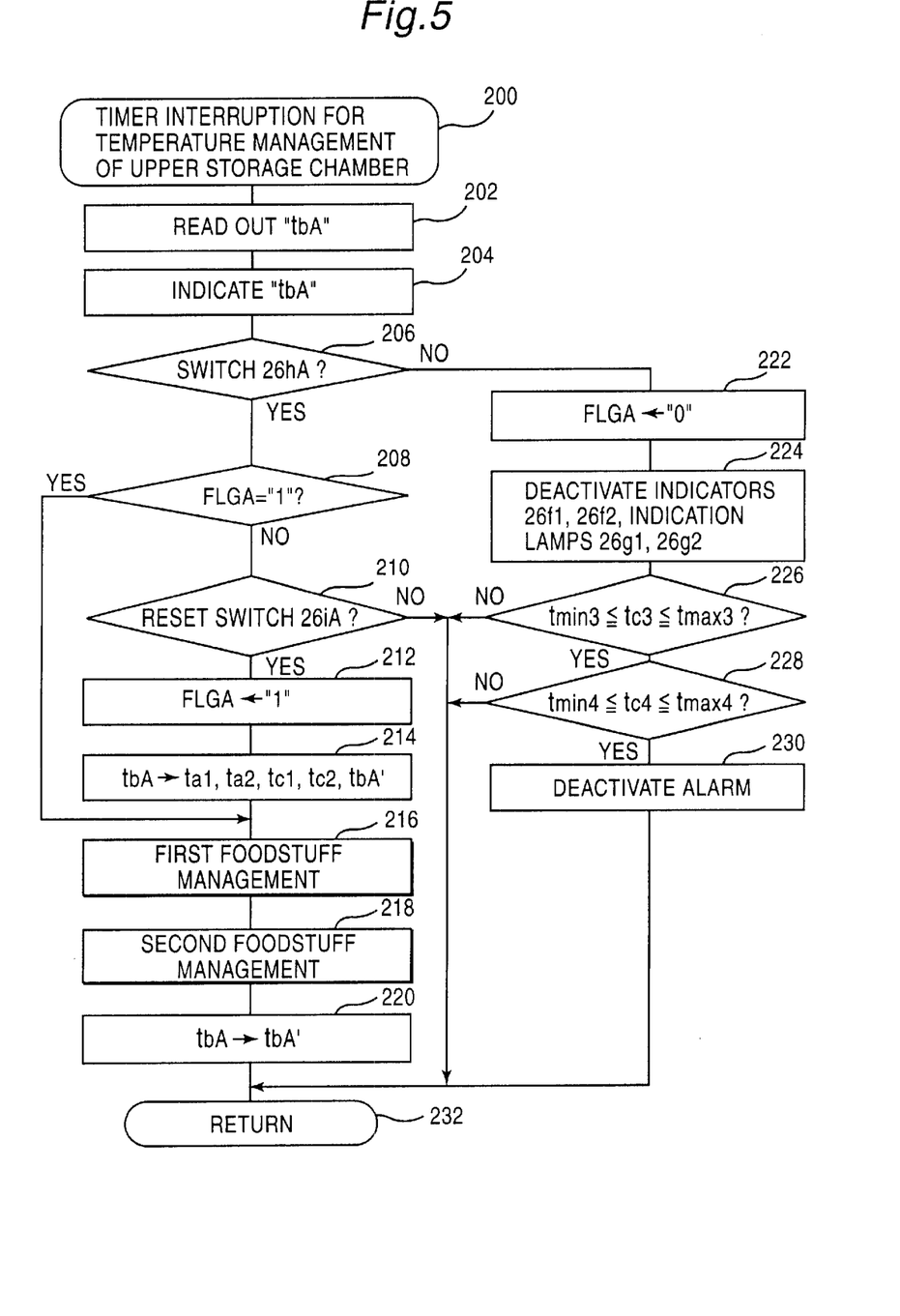
FIG. 5 is a flow chart of a timer Interruption program for temperature management of an upper storage chamber executed by the computer.
Figure 6:
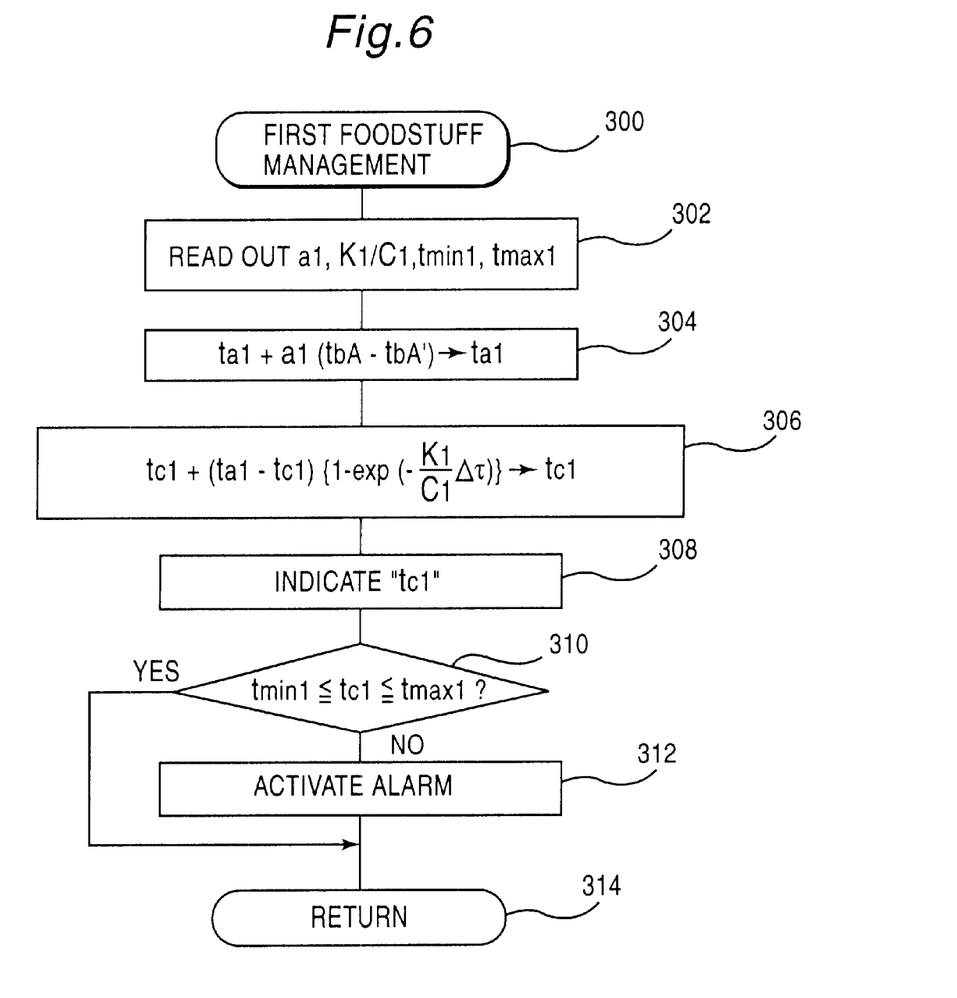
FIG. 6 is a flow chart of a first routine for temperature management of foodstuffs stored in the refrigerator shown in FIG. 5.
Figure 7:
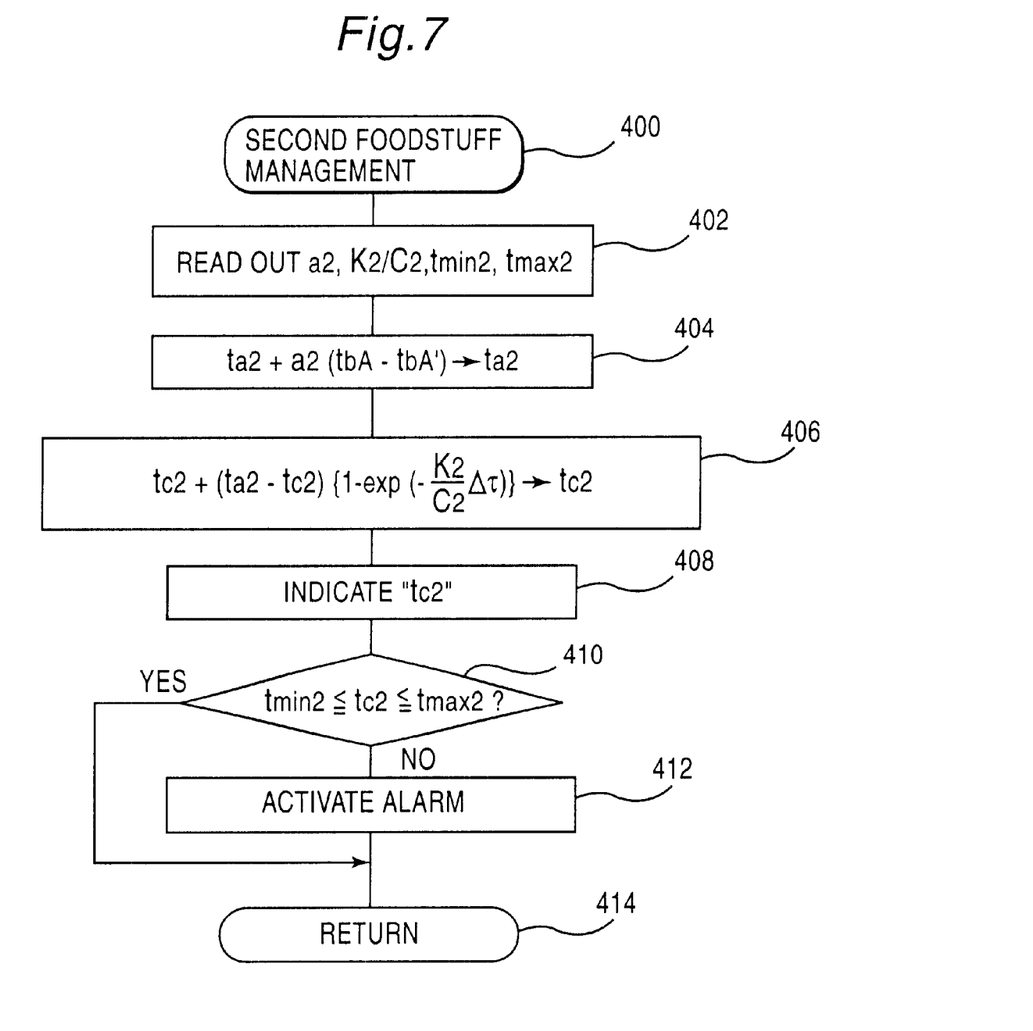
FIG. 7 is a flow chart of a second routine for temperature management of the foodstuffs in the refrigerator shown in FIG. 5.

During execution of the processing at step 102, the computer 30 executes the timer interruption program for temperature management of the upper storage chamber RA shown in FIGS. 5 to 7 upon each lapse of the short time $\Delta\tau$. The timer interruption program for temperature management is programmed to estimate each internal temperature of the foodstuffs F1–F4 for management thereof.

After started the timer interruption program for temperature management at step 200 in FIG. 5, the computer 30 reads out an inside temperature $t_{bA}$ of the upper storage chamber RA detected by sensor 17 at step 202 and causes the temperature indicator 26aA at step 204 to indicate the detected inside temperature $t_{bA}$. Subsequently the computer 30 determines at step 206 whether the foodstuff temperature management switch 26hA is being turned on or not. If the answer at step 206 is "Yes", the computer 30 causes the program to proceed to step 208 and determines at step 208 whether a flag FLGA is "1" or not. The flag FLGA set as "1" represents the fact that each temperature of the foodstuffs F1, F2 In the upper storage chamber RA Is being under management, and the flag set as "0" represents the fact that each temperature of the foodstuffs F1, P2 is not under management. As the flag FLGA is set as "0" at an initial stage, the computer 30 determines a "No" answer at step 208 and causes the program to proceed to step 210 for determining whether the reset switch 26iA has been turned on or not. If the answer at step 210 is "No", the program proceeds to step 232 and finishes the execution of the timer interruption program.

During execution of the processing at step 200 to 210 and 232, the computer 30 continues to renew the indication of the internal temperature indicator 26aA until the reset switch 26iA is turned on, and the foodstuffs F1, F2 in the upper storage chamber RA are continually cooled. When the foodstuffs F1, F2 are sufficiently cooled by lapse of a long time without open and close of the doors, each Internal temperature of the foodstuffs F1, F2 is stabilized. In such an instance, the reset switch 26 iA is turned on, and the computer 30 determines a "Yes" answer at step 210 and causes the program to proceed to step 212 for starting the temperature management of the foodstuffs F1, F2.

At step 212, the computer 30 sets the flag FLGA as "1" and sets each value of ambient temperatures $t_{a1}$, $t_{a2}$, foodstuff temperatures $t_{c1}$, $t_{c2}$ and a previously detected temperature $t_{bA}{'}$ as a detected temperature $t_{bA}$ to determine each initial value of temperatures $t_{a1}$, $t_{a2}$, $t_{c1}$, $t_{c2}$, $t_{bA}{'}$. The ambient temperatures $t_{a1}$, $t_{a2}$ represent each ambient temperature of the foodstuffs F1, F2, the foodstuff temperatures $t_{c1}$, $t_{c2}$ represent each internal temperature of the foodstuffs, and the previously detected temperature $t_{bA}{'}$ represents an inside temperature $t_{bA}$ detected by sensor 17 during previous execution of the timer interruption program.

When the program proceeds to step 216, the computer 30 executes processing for first foodstuff management shown in FIG. 6. After star-ed to execute the processing for first foodstuff management at step 300 of Fig. 6. the computer 30 reads out the correction coefficient al of the ambient temperature, the value $K_1/C_1$ of the radiation coefficient $K_1$ divided by the thermal capacity $C_1$, the lower and upper limit temperatures $t_{min1}$ and $t_{wax1}$ respectively set by the dials 26b1–28e1 on the operation panel 26. Subsequently, the computer 30 calculates the following formula (3) at step 304 to obtain the ambient temperature $t_{a1}$ of the foodstuff F1.

$$t_{a1}+a_1(t_{bA}-t_{bA}{'}) \rightarrow t_{a1} \quad (3)$$

Provided that, the value of ambient temperature $t_{a1}$ is not yet renewed from the value set at step 214 since the detected inside temperature $t_{bA}$ is the same value as the previously detected inside temperature $t_{bA}{'}$ by processing at step 214.

At the following step 306, the computer 30 calculates the following formula (4) to presume an internal temperature $t_{c1}$, of the foodstuff based on the ambient temperature $t_{a1}$.

$$t_{c1} + (t_{a1} - t_{c1})\left\{1 - \exp\left(-\frac{K_1}{C_1}\Delta\tau\right)\right\} \rightarrow t_{c1} \quad (4)$$

Provided that, the value of internal temperature $t_{c1}$ of the foodstuff is not yet renewed from the value set at step 214 since the ambient temperature $t_{a1}$ is the same value as the internal temperature $t_{c1}$ set by processing at step 214 and 304.

After calculation of the foregoing formula, the computer 30 causes the foodstuff temperature indicator 26f1 at step 308 to indicate the calculated internal temperature $t_{c1}$ of the foodstuff. In this instance, the computer 30 causes the indication lamp 26g1 to light with green color when the internal temperature $t_{c1}$ is maintained between the lower and upper limit temperatures $t_{min1}$ and $t_{max1}$, to light with blue color when the internal temperature $t_{c1}$ is lower than the lower limit temperature $t_{min1}$ and $t_{max1}$ to light with red color when the internal temperature $t_{c1}$ is higher than the upper limit temperature tmaxl In addition, the computer 30 activates the alarm device 33 at step 312 to issue an alarm sound when the internal temperature $t_{c1}$ is lower than the lower limit temperature $t_{min1}$ or higher than the upper limit temperature $t_{max1}$. Thereafter, the computer 30 finishes the processing for first foodstuff management at step 314 and executes processing for second foodstuff management at step 218 shown in FIG. 5.

As shown in detail in FIG. 7, the processing for second foodstuff management is programmed to use data $a_2$, $K_2$, $C_2$, $T_{a2}$, $t_{min2}$ and $t_{max2}$ substituted for the data $a_1$, $K_1$, $C_1$, $t_{a1}$, $t_{c1}$, $t_{min1}$ and $t_{max1}$ adapted to the processing for first foodstuff management in FIG. 6. During the processing for second foodstuff management, the computer 30 calculates an ambient temperature $t_{a2}$ of foodstuff F2 and an internal temperature $t_{c2}$ of foodstuff F2 on a basis of an inside temperature $t_{bA}$ of the upper storage chamber RA detected by sensor 17 and data $a_2$, $K_2/C_2$ set by dials 26b2, 26c2 for temperature management of the foodstuff F2 and controls each operation of the foodstuff temperature Indicator 26f2, indication lamp 26g2 and alarm device 33 based on the calculated internal temperature $t_{c2}$ of foodstuff F2.

After execution of the processing for second foodstuff management, the computer 30 sets a previously detected temperature $t_{bA}$, as the detected temperature $t_{bA}$ at step 220 in FIG. 5i for the following execution of the timer interruption program and finishes the execution of the timer interruption program for temperature management of the upper storage chamber at step 232.

Thereafter, the computer 30 executes the timer interruption program for temperature management of the upper storage chamber upon each lapse of the short time $\Delta\tau$ and determines a "Yes" answer at step 208 when the flag FLGA is set as "1" at step 212. thus, the computer 30 causes the program to proceed to step 216 without executing the processing at step 210–214. During execution of the processing at step 200–208, 216–220 and 232, the detected temperature $t_{bA}$ is renewed at step 202, and the ambient temperatures $t_{a1}$, $t_{a2}$ and internal temperatures told $t_{c2}$ of the foodstuffs are renewed respectively at step 304, 306 in FIG. 6 and step 404, 406 in FIG. 7. Thus, the computer 30 executes the processing at step 308, 408 based on the renewed internal temperatures $t_{c1}$, $t_{c2}$ of the foodstuffs for control of the indication on the operation panel 26 and also executes the processing at step 310, 312, 410 and 412 for control of the alarm device 33.

Figure 8:
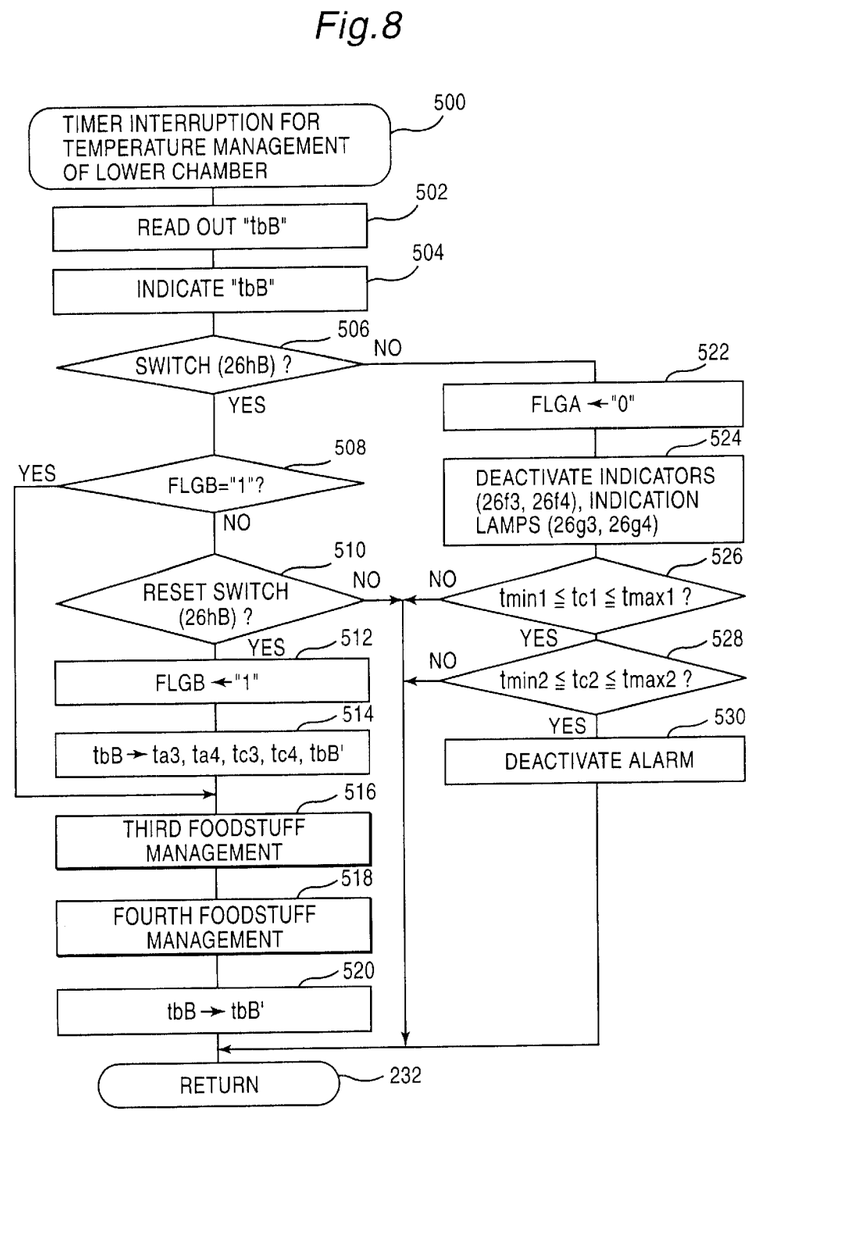
FIG. 8 is a flow chart of a timer interruption program for temperature management of a lower storage chamber executed by the computer.
Figure 9:
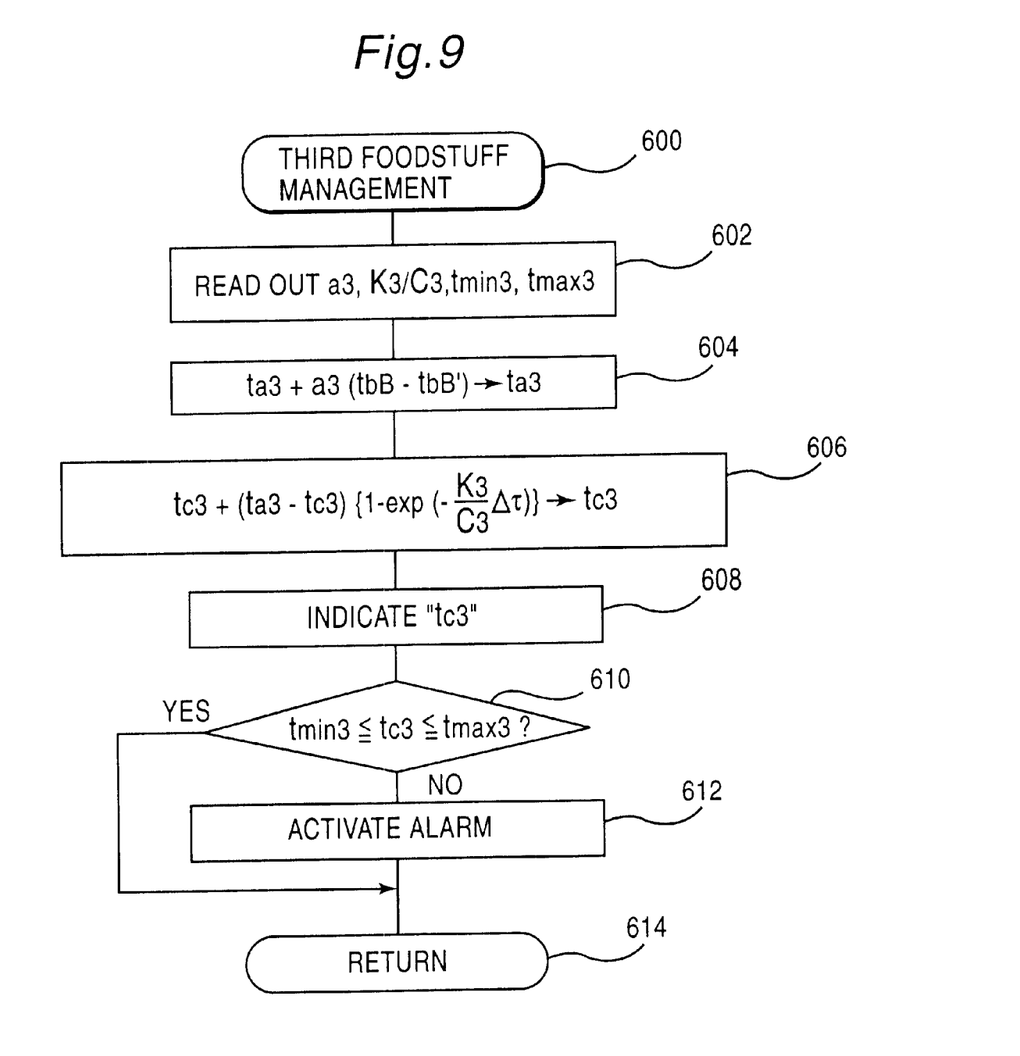
FIG. 9 is a flow chart of a third routine for temperature management of the foodstuffs in the refrigerator shown in FIG. 8.
Figure 10:
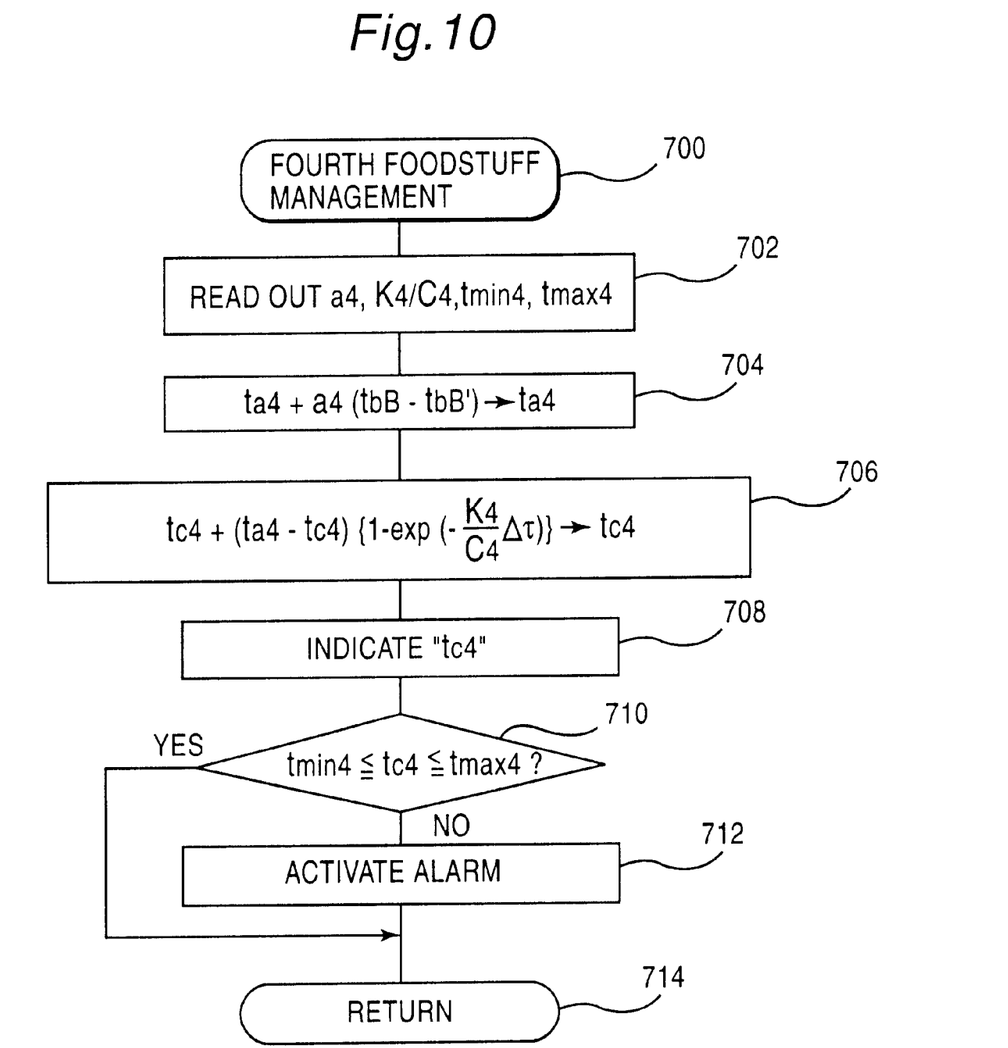
FIG. 10 is a flow chart of a fourth routine for temperature management of the foodstuffs in the refrigerator shown in FIG. 8.

When lapse of the short time $\Delta\tau$ is measured by the timer 45 for temperature management of the lower storage chamber during repetitive execution of the processing at step 102 in FIG. 4, the computer 30 executes the timer interruption program for temperature management of the lower storage chamber shown in FIGS. 8 to 10. The timer interruption program for temperature management of the lower storage chamber is programmed to presume each internal temperature of third and fourth foodstuffs F3 and F4 in the lower storage chamber RB. During execution of processing at step 500–508, 516–520 and 532 of the program, the computer 30 causes the internal temperature indicator 26aB to indicate an inside temperature $t_{bB}$ of the lower storage chamber RB detected by sensor 18 and calculates internal temperatures $t_{c3}$, $t_{c4}$ of the third and fourth foodstuffs F3, F4 based on the detected inside temperature $t_{bB}$. Thus, the computer 30 controls each operation of the foodstuff temperature indicators 26f3, 26f4, indication lamps 26g3, 26g4 and alarm device 33.

When the foodstuff temperature management switch 26hA is turned off during execution of the processing at step 200–208, 216–220 and 232, the computer 30 determines a "No" answer at step 206 and causes the program to proceed to step 222. At step 222, the computer 30 sets the flag FLGA to "0" for representing the fact that each temperature of the first and second foodstuffs F1, F2 is not under management. At the following step 224, the computer 30 deactivates the foodstuff temperature indicators 26f1, 26f2 and indication lamps 26g1, 26g2. If the alarm device 33 is activated by the processing at step 226–230 on a basis of the internal temperatures $t_{c1}$, $t_{c2}$ of first and second foodstuffs F1, F2, the computer 30 deactivates the alarm 33 in a condition where both the internal temperatures tc3, tc4 of third and fourth foodstuffs F3, F4 are maintained higher than the lower limit temperatures $t_{min3}$, $t_{min4}$ and lower than the upper limit temperatures $t_{max3}$, $t_{max4}$.

When the foodstuff temperature management switch 26hB is turned off during execution of the processing at step 500–508, 516–520 and 532, the computer 30 determines a "No" answer at step 506 and causes the program to proceed to step 522. At step 522, the computer 30 sets the flag FLGA as "O" for representing the fact that the third and fourth foodstuffs F3, F4 are not under temperature management. Thus, the computer 30 deactivates the foodstuff temperature indicators 26f3, 26f4 and indication lamps 26g3, 26g4 at the following step 524. If the alarm device 33 is activated by the processing at step 526–530 on a basis of the internal temperatures $t_{c3}$, $t_{c4}$ of third and fourth foodstuffs F3 and F4, the computer 30 deactivates the alarm device 33 in a condition where the internal temperatures $t_{c1}$, $t_{c2}$ of first and second foodstuffs F1 and F2 are maintained higher than the lower limit temperatures $t_{min1}$, $t_{min2}$ and lower than the upper limit temperatures $t_{max1}$, $t_{max2}$.

With the embodiment described above, the internal temperatures tc1–tc4 of the foodstuffs F1–F4 can be presumed on a basis of changes or inside temperatures $T_{bA}$, $T_{bB}$ detected by the temperature sensors 17, 18 upon each lapse of the short time for proper temperature management of the foodstuffs. The presumed internal temperatures $t_{c1}$–$t_{c4}$ of the foodstuffs F1–F4 are indicated by the foodstuff temperature indicators 26f1–26f4 and indicated with a different color on the indication lamps 26g1–26g4. When the presumed internal temperatures $t_{c1}$–$t_{c4}$ of the foodstuffs become lower than the lower limit temperatures $t_{min1}$–$t_{min4}$ or higher than the upper limit temperatures $t_{max1}$–$t_{max4}$, the alarm device 33 is activated to issue an alarm sound.

In the case that the temperature sensors are placed adjacent the respective foodstuffs or the storage capacity of the refrigerator is small, the correction coefficients $a_1$–$a_4$ each may be determined in a value of "1", and the inside temperatures $t_{bA}$, $t_{bB}$ detected by the temperature sensors 17, 18 may be deemed as the ambient temperatures $t_{a1}$–$t_{a4}$ for presuming the internal temperatures of the foodstuffs based thereon. In this case, the detected inside temperatures $t_{bA}$, $t_{bB}$ may be substituted for the ambient temperatures $t_{a1}$–$t_{a4}$ calculated by the processing at step 306. 406, 606 and 706.

Although in the embodiment, the computer 30 for control of the compressor 21 and cooling blower 23 in the refrigerator has been adapted to execute the timer interruption programs for temperature management, an electric control circuit may be provided independently from the computer 30 for executing only the timer interruption programs. Although in the embodiment, the temperature management apparatus has been adapted to the refrigerator, the temperature management apparatus can be adapted to any foodstuff storage cabinet.

What is claimed is:

1. A temperature management apparatus for managing the temperature of foodstuffs that are stored in a storage cabinet, the apparatus comprising:

a temperature sensor for detecting an inside temperature of the storage cabinet;

ambient temperature detection means for detecting and managing an ambient temperature of the foodstuffs that are stored in the storage cabinet on a basis of changes of the inside temperature detected by the temperature sensor upon each lapse of a predetermined time;

foodstuff temperature presumption means for presuming an internal temperature of the foodstuffs on a basis of change of the detected ambient temperature; and indication means for indicating the presumed internal temperature of the foodstuffs.

2. A temperature management apparatus as claimed in claim 1, further comprising alarm means for issuing an alarm when the presumed internal temperature of the foodstuffs is out of a predetermined temperature range.

3. A temperature management apparatus for managing the temperature of foodstuffs that are stored in a storage cabinet, the apparatus comprising:

a temperature sensor for detecting and managing an inside temperature of the storage cabinet;

foodstuff temperature presumption means for presuming an internal temperature of the foodstuffs on a basis of changes of the inside temperature detected by the temperature sensor upon each lapse of a predetermined time; and indication means for indicating the presumed internal temperature of the foodstuffs.

4. A temperature management apparatus for managing the temperature of foodstuffs that are stored in a storage cabinet of a refrigerator, the apparatus comprising:

a temperature sensor for detecting an inside temperature of the storage cabinet;

ambient temperature detection means for detecting and managing an ambient temperature of the foodstuffs that are stored in the storage cabinet on a basis of changes of the inside temperature detected by the temperature sensor upon each lapse of a predetermined time;

foodstuff temperature presumption means for presuming an internal temperature of the foodstuffs on a basis of changes of the detected ambient temperature; and indication means for indicating the presumed internal temperature of the foodstuffs.

5. A temperature management apparatus as claimed in claim 4, wherein said indication means comprises an indication lamp arranged to light with green color when the presumed internal temperature of the foodstuffs is maintained in a predetermined temperature range and to light with red color when the presumed internal temperature of the foodstuffs is out of the predetermined temperature range.

6. A temperature management apparatus as claimed in claim 5, further comprising alarm means for issuing an alarm when the presumed internal temperature of the foodstuffs becomes out of the predetermined temperature range.

* * * * *